United States Patent Office 3,812,058
Patented May 21, 1974

3,812,058
ACTIVATION OF OLEFIN POLYMERIZATION
CATALYSTS
Benny E. Nasser, Jr., Bartlesville, Okla., assignor to
Phillips Petroleum Company, Bartlesville, Okla.
No Drawing. Filed Nov. 11, 1971, Ser. No. 197,950
Int. Cl. B01j 11/06, 11/32
U.S. Cl. 252—458                              10 Claims

ABSTRACT OF THE DISCLOSURE

A method of activating a moisture-containing composition to produce a composition active as a polymerization catalyst which involves heating the composition to a temperature of maximum moisture release therefrom and then increasing the temperature of the composition to the activation temperature.

This invention pertains to the activation of moisture-containing compositions to convert them into catalysts.

In one of its more specific aspects, this invention relates to a method of activating or calcining such compositions, the method of influencing the nature of the product produced with the resulting catalyst.

It is conventional to activate various compositions to convert them into catalysts such as those employed in ethylene and propylene polymerizations, these polymerization processes and catalysts being such as those disclosed in U.S. Pat. 2,825,721 and British Pat. 853,414, both of which disclosures are incorporated herein by reference. Such activation usually serves to expel moisture from the composition and to convert certain components therein, usually chromium and titanium, to forms in which they are catalytically active. These procedures, as applied to compositions convertible to polymerization catalysts, involve heating the composition in the presence of an oxygen-containing gas, preferably air, at temperatures within the range of about 750° F. to about 1800° F. Such procedures frequently are carried out in conjunction with compositions which comprise a support having a large surface area and large pore diameter.

It has now been found that the employment of certain techniques during such activation procedures has an effect on the nature of the catalyst produced. This invention relates to techniques applicable principally to compositions which in their catalytic form comprise supported chromium oxide alone, or in conjunction with adjuvants such as titanium oxide, a portion of the chromium being in the hexavalent state.

According to this invention, there is provided a method for activating a composition to produce a supported catalyst suitable for the polymerization of olefins which involves preheating the composition by introducing it into the activator which is maintained at a temperature of not less than 500° F. to rapidly heat the composition and increasing the temperature of the composition from the temperature at which it is introduced into the activator substantially continuously up to the temperature at which it is activated, that is a temperature within the range of from about 750° F. to about 1800° F. Preferably, the composition is heated from the temperature at which it is introduced into the activator, generally room temperature to about 600 to 650° F. in less than about one minute.

The method of this invention can be carried out by introducing the composition at room temperature into a heating zone in which it is heated to at least about 600 to 650° F., its temperature being increased substantially continuously up to that range within a few seconds. The preheated composition is then, without a substantial decrease in its temperature, heated to a temperature with the range of activation at which temperature it is maintained for a period sufficient to activate the composition. An oxygen-containing gas, such as air, can be introduced into contact with the catalyst throughout over the process or only during the final activation step, the gas being preheated as required to avoid a decrease in the temperature of the composition.

The use of the method of this invention results in a catalyst which produces high melt index polymers. While the invention can be carried out in either a batch or continuous process, it is more conveniently adapted to a batch process.

The method of this invention appears to produce a catalyst having a larger percentage of its structure in the form of large pores probably because the method of this invention rapidly heats the wet composition to a temperature of maximum moisture release from the composition, preferably prior to its introduction into the activator. As a result, there is produced by the catalyst of this invention polymers of higher melt indices.

The method of this invention is illustrated by the following which describes, as Run II, the best mode for carrying out the invention.

In Run I, composition comprising a silica support, about 1 weight percent chromium and about 2.3 weight percent titanium was activated according to the prior art method. The composition was introduced into an activator maintained at room temperature and the activator containing the composition was then heated to a temperature of about 1400° F. at a rate of temperature increase of about 100° F. per hour. The composition was maintained at 1400° F. for a period sufficient to convert the composition to a catalyst active in olefin polymerization.

In Run II, a substantially identical composition was activated according to the method of this invention. The composition was introduced into an activator maintained at about 700° F. at a rate at which the composition was heated to about 700° F. in less than about one minute, the temperature of the activator being maintained at a temperature above about 650° F. at all times. When the entire quantity of the composition had been introduced into the activator, the temperature of the activator and the composition therein was increased to about 1400° F. and maintained at that temperature for a period sufficient to convert the composition to a catalyst active in olefin polymerization.

The catalysts were then individually employed in ethylene polymerization under substantially identical prior art conditions with the following results:

| Catalyst | Preheat temp., ° F. | Productivity, #/# | Polymer melt index |
|---|---|---|---|
| I | None | 4,000 | 0.75 |
| II | 700 | 3,980 | 2.31 |

It will be seen from the above comparison that under otherwise substantially identical conditions, that catalyst produced by activating a composition according to the method of this invention produced a polymer of decidedly higher melt index.

It will be evident from the foregoing that various modifications can be made to the method of this invention. Such are, however, considered to be within the scope of the invention.

What is claimed is:
1. A method of activating a composition comprising chromium on a silica support to convert said composition to a catalyst active for olefin polymerization which comprises:
(a) introducing said composition into an activator maintained at a temperature not less than 500° F.;

(b) increasing the temperature of said composition substantially continuously up to activation temperature; and, (c) maintaining said composition at said activation temperature for a period sufficient to activate said composition.

2. The method of claim 1 in which said composition is introduced into said activator at about room temperature and is heated to a temperature within the range of from about 600 to about 650° F. in less than about one minute.

3. The method of claim 1 in which said composition is contacted with an oxygen-containing gas in said activator.

4. The method of claim 1 in which said composition is heated to a temperature above room temperature prior to its introduction into said activator.

5. The method of claim 1 in which said composition is introduced into said activator, said composition being at room temperature, said activator being at a temperature of about 700° F.

6. The method of claim 5 in which the temperature of said activator decreases from about 700° F. to about 650° F. upon the introduction of said composition.

7. The method of claim 1 in which said composition contains in addition titanium.

8. The catalytic composition activated by the method of claim 1.

9. The catalytic composition activated by the method of claim 5.

10. The catalytic composition activated by the method of claim 7.

References Cited

UNITED STATES PATENTS

| | | | |
|---|---|---|---|
| 3,622,521 | 11/1971 | Hogan | 252—458 X |
| 3,172,882 | 3/1965 | Witt | 252—458 X |
| 2,783,134 | 2/1957 | Hughes et al. | 252—458 X |

CARL F. DEES, Primary Examiner